(12) United States Patent
Betz et al.

(10) Patent No.: US 11,914,474 B2
(45) Date of Patent: *Feb. 27, 2024

(54) EFFICIENT MANAGEMENT OF FAILED MEMORY BLOCKS IN MEMORY SUB-SYSTEMS

(71) Applicant: Micron Technology, Inc., Boise, ID (US)

(72) Inventors: Tyler L. Betz, Meridian, ID (US); Andrew M. Kowles, Seattle, WA (US); Adam J. Hieb, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/167,992

(22) Filed: Feb. 13, 2023

(65) Prior Publication Data

US 2023/0195572 A1 Jun. 22, 2023

Related U.S. Application Data

(63) Continuation of application No. 16/947,975, filed on Aug. 26, 2020, now Pat. No. 11,579,968.

(51) Int. Cl.
*G06F 11/07* (2006.01)
*G06F 11/10* (2006.01)
*G06F 3/06* (2006.01)

(52) U.S. Cl.
CPC ........ *G06F 11/1068* (2013.01); *G06F 3/0619* (2013.01); *G06F 3/0644* (2013.01); *G06F 3/0653* (2013.01); *G06F 3/0679* (2013.01); *G06F 11/076* (2013.01); *G06F 11/0772* (2013.01)

(58) Field of Classification Search
CPC .. G06F 11/1068; G06F 3/0619; G06F 3/0644; G06F 3/0653; G06F 3/0679; G06F 11/076; G06F 11/0772; G06F 11/073
USPC .......................................................... 714/764
See application file for complete search history.

(56) References Cited

U.S. PATENT DOCUMENTS

| | | | | |
|---|---|---|---|---|
| 5,974,544 A | * | 10/1999 | Jeffries | G11B 20/1883 714/E11.088 |
| 6,425,108 B1 | * | 7/2002 | Chiang | G11C 29/52 714/764 |
| 6,594,785 B1 | * | 7/2003 | Gilbertson | G06F 11/0712 714/48 |
| 6,785,835 B2 | * | 8/2004 | MacLaren | G11C 29/74 714/764 |

(Continued)

*Primary Examiner* — Samir W Rizk
*Assistant Examiner* — Enam Ahmed
(74) *Attorney, Agent, or Firm* — LOWENSTEIN SANDLER LLP (57) ABSTRACT

Disclosed is a system including a memory device having a plurality of physical memory segments and a processing device to perform operations that include, responsive to detecting a failure of a memory operation associated with a physical memory segment of the plurality of physical memory segments, quarantining the physical memory segment, responsive to quarantining the physical memory segment, performing one or more scanning operations on the physical memory segment, and determining, based on results of the one or more scanning operations, a viability status of the physical memory segment, wherein the viability status indicates an ability of the physical memory segment to store data.

20 Claims, 6 Drawing Sheets

(56) References Cited

U.S. PATENT DOCUMENTS

| | | | |
|---|---|---|---|
| 7,707,472 B1* | 4/2010 | Dastidar | G11C 29/16 |
| | | | 714/733 |
| 7,730,153 B1 | 6/2010 | Gole et al. | |
| 8,566,671 B1* | 10/2013 | Ye | G11C 29/42 |
| | | | 714/764 |
| 2010/0293440 A1 | 11/2010 | Thatcher et al. | |
| 2011/0063918 A1 | 3/2011 | Pei et al. | |
| 2012/0008405 A1 | 1/2012 | Shah et al. | |
| 2013/0028021 A1 | 1/2013 | Sharon et al. | |
| 2013/0166991 A1 | 6/2013 | Shimada | |
| 2013/0229868 A1* | 9/2013 | Koh | G11C 16/10 |
| | | | 365/185.03 |
| 2014/0137119 A1 | 5/2014 | Hyde et al. | |
| 2014/0325115 A1 | 10/2014 | Ramsundar et al. | |
| 2015/0046770 A1* | 2/2015 | Luo | G06F 11/1402 |
| | | | 714/764 |
| 2015/0149863 A1 | 5/2015 | Hashimoto | |
| 2015/0199234 A1* | 7/2015 | Choi | G11C 29/4401 |
| | | | 714/764 |
| 2016/0170618 A1 | 6/2016 | Song et al. | |
| 2017/0147295 A1 | 5/2017 | Friedlander et al. | |
| 2017/0235633 A1 | 8/2017 | Park | |
| 2021/0182141 A1 | 6/2021 | Balb et al. | |
| 2022/0164107 A1* | 5/2022 | Tan | G06F 3/0604 |
| 2022/0283721 A1 | 9/2022 | Dixon | |
| 2022/0392552 A1* | 12/2022 | Pitner | G11C 16/0483 |
| 2023/0077517 A1* | 3/2023 | Hsu | G11C 11/5642 |
| | | | 714/764 |

\* cited by examiner

FIG. 6

EFFICIENT MANAGEMENT OF FAILED MEMORY BLOCKS IN MEMORY SUB-SYSTEMS

This application is a continuation application of co-pending U.S. patent application Ser. No. 16/947,975, filed Aug. 26, 2020, which is incorporated herein by reference.

TECHNICAL FIELD

Embodiments of the disclosure relate generally to memory sub-systems, and more specifically, relate to efficient management of failed memory blocks in memory sub-systems.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure.

DETAILED DESCRIPTION

Aspects of the present disclosure are directed to efficient management of physical memory blocks involved in failed operations in memory sub-systems. A memory sub-system can be a storage device, a memory module, or a hybrid of a storage device and a memory module. Examples of storage devices and memory modules are described below in conjunction with FIG. 1. In general, a host system can utilize a memory sub-system that includes one or more memory components, such as memory devices that store data. The host system can provide data to be stored in the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dice. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values. Memory operations that can be performed on a block, a page, or some other memory segment can include program, read, and/or erase operations. During a program operation, a hardware circuit of the memory sub-system can deposit electric charge on the floating gates of the transistor cells where data is to be stored and thus change the threshold gate voltages at which the cells transition to a conducting state. The precise values of the resulting threshold voltages can be used to encode which single-bit or multi-bit state is stored in the memory cell. Thus, the state of the memory cell identifies the digital data stored (i.e., programmed) in the cell. The state of the memory cell can be ascertained by a read operation during which the hardware circuit probes the current-voltage response of the memory cell and determines the value of the cell's threshold voltage to read the digital data stored in the cell. Before a memory cell can be overwritten with new data, an erase operation is normally used to remove electrons (e.g., by applying a large voltage between the floating gate and a dielectric substrate that hosts the transistors) and return the memory cell to a state where additional electrons can be deposited on the floating gate in a controlled manner.

Since highly mobile electrons are used to store information in memory cells, errors during various memory operations are not uncommon. Threshold voltages (states) of memory cells can be disturbed (e.g., by electrostatic capacitive coupling with other cells) and change with time. Repeated read operations can result in eventual deterioration of memory cells and a systematic drift of the threshold voltages, resulting in a limited lifetime of the cells. Memory partitions (e.g., cells, pages, blocks, etc.) that are on the verge of failing (i.e., bad memory partitions) can be "folded" and have data previously stored moved to healthier memory locations. Bad memory partitions cannot reliably store data and can be taken out of circulation. For example, a failure of an erase operation that fails to return the block (in some memory devices an erase operation is applied to all cells of the block) to the programmable state can be an indication that the block has become bad.

Accordingly, in typical memory subsystems, upon the very first erase, program, or read operation failure, the suspect block is removed from circulation and retired. Such procedures help to maintain integrity of data. Yet, some of the blocks retired as presumptively bad are in fact good or at least still contain multiple good pages capable of providing a reliable storage functionality. Some of the detected memory operation failures are the result of electrostatic interference with adjacent memory pages and blocks undergoing various program and erase operations. Some of the detected memory operation failures can be artifacts of the broader physical environment, such as power surges, and the like. Some of the blocks can contain individual pages that indeed suffer from a deteriorated storage function, whereas other pages of the same block are quite robust. As a result, default retirement of blocks that failed for the very first time results in a premature retirement of many viable blocks. This reduces the capacity of the memory systems, shortens their lifetime, leads to unnecessary warranty returns of the memory devices (and host computers), and so on. With memory blocks constantly increasing in size in modern devices, such a default block retirement routine often wastes significant memory resources.

Aspects of the present disclosure address the above and other deficiencies by implementing efficient management of failed blocks in memory sub-systems. In some embodiments, upon detecting a failure of a memory access operation (e.g., an erase or program operation), the memory sub-system controller of the memory sub-system can place the memory block in question at a tail end of a list of free blocks that are currently not storing data, and can associate a quarantine flag with the memory block. When a communication channel between the memory partition containing the quarantine block becomes available (e.g., during a global system downtime or when a particular hardware communication channel is not in heavy use), the memory sub-system controller can conduct one or more diagnostic scans or checks, for example, perform a number of trial read or/and program operations, perform detection of bit error rate (BER) for various pages of the block, perform a variety of memory operations on neighboring blocks (pages, etc.) of the tested block, and so on.

As a result of such diagnostic scanning, the memory sub-system controller can reach one of several conclusions, for example, 1) that the quarantined block is indeed bad, 2) that the quarantined block is good and that the triggering operation failure was a one-off event which unlikely to occur in the future, or 3) that some of the block's memory pages are still good while other pages are unfit for future use. Accordingly, the memory sub-system controller can take a number of actions, such as 1) retire the quarantined block, 2) remove the quarantine flag and place the block into normal circulation, or 3) identify parts of the block (e.g., pages) that can be used, together with parts of other similarly partially-viable blocks, to stack up to a standard block size which can then be provided for use to a host system.

Similarly, in some embodiments, upon detecting a failure of a read operation, the memory sub-system controller of the memory sub-system can schedule the memory block in question for diagnostic scanning. In some embodiments, if the data stored in the block is needed quickly, the diagnostic scanning can be performed immediately, without waiting for a downtime or the hardware channel availability. In some embodiments, the block can be folded (with its data transferred to other blocks), placed on the free list of blocks, and subsequently treated similarly to blocks that failed an erase or a program operation. In some embodiments, the block is not folded but undergoes an error correction procedure performed by an error correction code (ECC), including parity checks, BER checks, and so on. If the ECC has succeeded in recovering data stored in the block, the block can be scheduled for subsequent diagnostic scanning at the time of the channel availability. The diagnostic scanning can perform BER testing of some or all pages in the block. The memory controller can schedule the block for folding if the BER for tested pages exceeds a certain threshold. In some embodiments, the memory controller can identify pages that are non-viable and further identify pages that are relatively robust (e.g., whose BER falls below a certain level) and which can be used, together with pages of other partially-viable blocks to make up a full block size.

Advantages of the present disclosure include, but are not limited to avoiding premature retirement of viable memory blocks, extending lifetime of memory devices, and preventing unwarranted customer complaints and eliminating wasteful return of memory devices.

Figure 1:
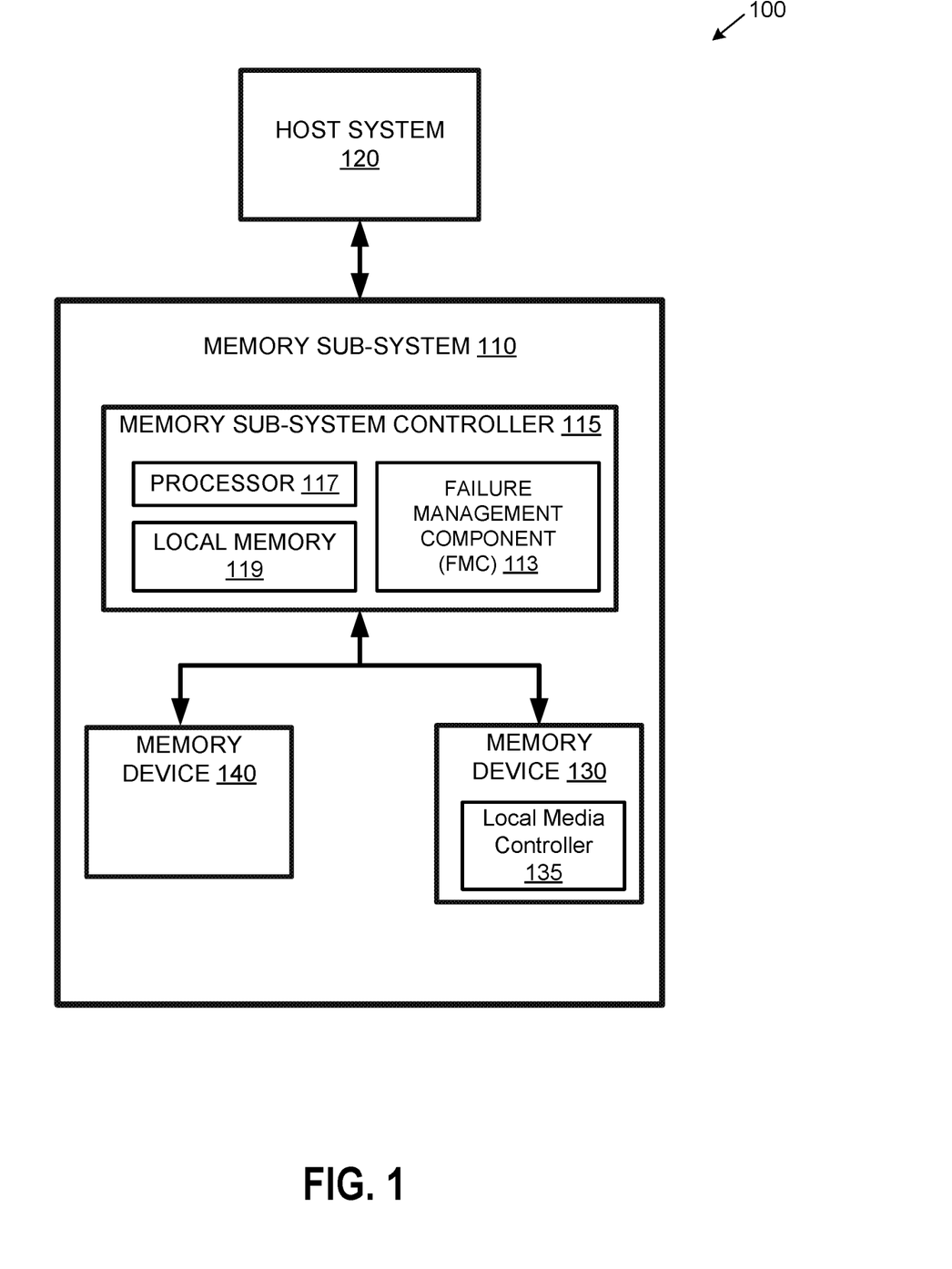
FIG. 1 illustrates an example computing system that includes a memory sub-system, in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM).

A memory sub-system controller 115 (or controller 115, for simplicity) can communicate with the memory devices 130 to perform operations such as reading data, writing (programming) data, or erasing data at the memory devices 130, and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), zoned namespace, etc.) and a physical address (e.g., physical block address PBA) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a failure management component (FMC) 113 which can detect a failure of a memory operation associated with a physical memory block, or other segment, associate a quarantine flag with the physical memory block, perform one or more scanning operations to determine viability of the physical memory block, and assign a viability status to the physical memory block, and so on. The viability status can indicate an ability of the physical memory block to store data. The FMC 113 can further take one or more actions with regards to the physical memory block, such as retiring the block, placing the block in normal unrestricted circulation, or identifying viable memory pages of the block and mapping viable memory pages from two or more blocks to a single LBA provided to the host system 120.

In some embodiments, the FMC 113 can perform block scans during idle time of the memory sub-system, (e.g., when a number of write, erase, and/or read requests per unit of time falls below a certain set threshold for a specific hardware channel corresponding to the quarantined/tested block or for the memory device as a whole). In some embodiments, the FMC 113 can perform diagnostic block scans in bulk, responsive to a number of the most recent erase/program/read blocks that that failed, for all or some of the blocks that failed. In some embodiments, the FMC 113 can perform diagnostic scans at fixed intervals of time that has elapsed since the commencement (or conclusion) of an earlier diagnostic scan. In some embodiments, the FMC 113 can perform diagnostic scans at specific time intervals—every hour, every day, or every other time unit, as configured by the memory sub-system 110 and/or by the host system 120, or by a human operator (e.g., a hardware engineer or a system administrator). In some embodiments, the monitoring schedule of the diagnostic scans can be stored in the local memory 119 (e.g., in the embedded memory).

In some embodiments, the memory sub-system controller 115 includes at least a portion of the FMC 113. For example, the memory sub-system controller 115 can include a processor 117 (e.g., a processing device) configured to execute instructions stored in local memory 119 for performing the operations described herein. In some embodiments, the FMC 113 is part of the host system 120, an application, or an operating system. In some embodiments, the FMC 113 can have configuration data, libraries, and other information stored in the memory device 130 (and/or the memory device 140). In other embodiments, local media controller 135 includes at least a portion of the FMC 113 and is configured to perform the functionality described herein.

Figure 2:
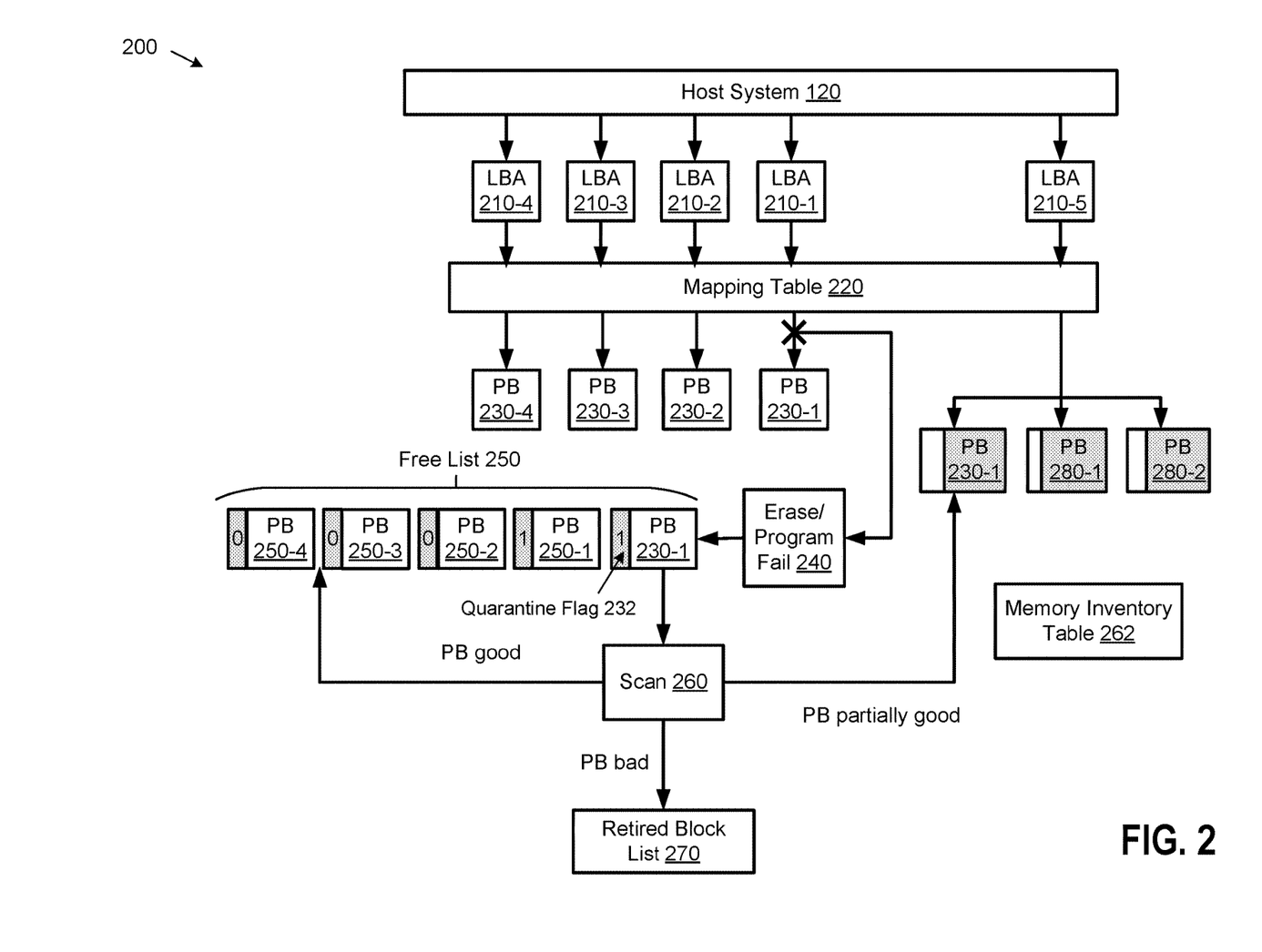
FIG. 2 illustrates schematically a high-level description of efficient management of memory blocks involved in failed erase and/or program operations in memory sub-systems, in accordance with some embodiments of the present disclosure.

FIG. 2 illustrates schematically a high-level description of efficient management 200 of memory blocks involved in failed erase and/or program operations in memory sub-systems, in accordance with some embodiments of the present disclosure. As illustrated in FIG. 2, the host system 120 (e.g., the host's operating system or any application executed on the host system) can communicate a memory operation, e.g., erase or program request to the memory sub-system 110. The request can include an LBA 210 within the logical space of the memory subsystem 110, or within a part of the logical space accessible to the originator of the request. The LBA 210 can be used by the memory sub-system controller 115 to identify a physical memory partition (block, page, plane, etc.) to which the received memory request is related. For the sake of concreteness, the instant disclosure refers to "blocks," but it should be understood that memory operations described can operate on physical memory partitions of any size and/or place in the memory hierarchy (e.g., pages, wordlines, planes, dies, and the like).

The memory sub-system controller 115 can access a mapping table 220 (which is also known as a memory look-up table) to determine the physical memory addresses (PBA) of the physical memory blocks 230 that correspond to the LBA 210. Shown are, for the sake of illustration, LBAs 210-1 ... 210-5. The mapping table 220 can map each of the LBAs 210 to physical memory addresses of the corresponding physical memory blocks 230-1 ... 230-4. The controller 115 can execute the received memory request directed to the block 230 identified by the mapped LBA. For example, the controller 115 can perform a memory operation (e.g., an erase or program operation) on the block 230-1 identified by the LBA 210-1. In some instances, as indicated schematically by the cross, the memory operation fails. Responsive to detecting the memory operation failure, the FMC 113 of the memory controller 115, can perform various operations for efficient management of failed memory blocks. It shall be understood that operations described below as being performed by the FMC can, alternatively be performed by other components of the controller 115 or by the local media controller 135. Specifically, the FMC 113 can detect the erase or program failure 240 via the hardware circuitry of the memory sub-system 110. In some embodiments, the block 230-1 is not retired by default, but subjected to a post-failure procedure.

In some embodiments, the failed block 230-1 is placed on a free list 250 of physical blocks. The free list 250 can be maintained by the memory sub-system controller 115 (or by the local media controller 135) as a list of blocks that are currently not storing valid data. The free list 250 can include blocks that are available for erase and program operations, and can also include blocks that are not to be used, at least temporarily, for new data storage. The FMC 113 can keep track of the type of blocks on the free list 250 using a designated identifier, e.g., a quarantine flag 232. The quarantine flag 232 can be a single-bit flag indicating whether the block is available for programming, e.g., flag value 0 (or 1) or whether the block is quarantined, flag value 1 (or 0). In some embodiments, the quarantine flag can be a multi-bit flag. Additional bits can identify a reason for the block acquiring the quarantined status, e.g., whether the block failed an erase, a program, or a read operation. The reason identifier can be used by the FMC 113 to select a diagnostic procedure to be applied to the block 230-1 depending on the type of failure. In FIG. 2, the quarantine flag is schematically depicted as part of the physical block, but in some embodiments the quarantine flag can be a field in the corresponding entry LBA→PBA of the mapping table 220. In some embodiments, the quarantine flags of PBs physical blocks can be tracked in a table separate from the mapping table and accessible to the memory sub-system controller 115, such as a memory inventory table 262.

As illustrated, the block 230-1 can be placed at the tail end of the free list 250. Opposite the tail can be a head of the free list 250. The memory blocks at the head of the free list 250 can be used first for data programming, as the need arises. For example, the block 250-4 can be the first block in line for the next programming operation. Conversely, the block 230-1 at the tail end of the free list 250 can be (currently) the last block on the programming queue.

After a block, e.g., block 230-1, is placed on the free list 250, the FMC 113 can perform a scan 260 that can include a variety of diagnostic operations. In some embodiments, the scan 260 can be performed at downtime of the memory sub-system 110. In some embodiments, the scan 260 can be performed when utilization of a communication channel between the memory sub-system controller 115 and the memory partition that contains the block to be scanned falls below a pre-determined threshold. In some embodiments, the diagnostic scan is performed at regular time intervals. At the completion of the scan 260, the FMC 113 can determine if the block is to be placed on a retired block list 270 or move the block up the free list 250 and into unrestricted circulation. In some embodiments, the scan 260 can determine that the block is partially viable, can further identify pages of the block that are still capable of storing data, and partially retire the pages of the block that are no longer capable of storing data.

During the scan 260, the FMC 113 can perform some or all of the following diagnostic operations on the block 230-1 (or on any other block or another memory partition of the memory sub-system 110).

The FMC 113 can perform an erase operation. (If the failed operation involved an erase operation, one or more additional erase operations can be performed.) The FMC 113 can subsequently perform testing of the threshold voltages of the memory cells in the block 230-1. Specifically, a fully and successfully erased block can have threshold voltages below the lowest "valley" (Valley 0) of the threshold voltage distribution. The FMC 113 can probe the success of the erase operation by applying gate voltages within Valley 0 to various cells of the block and measuring the source-drain current. A correctly erased cell should be displaying adequate source-drain conduction. On the other hand, a cell having a residual charge on the floating gate is likely to have a threshold voltage above Valley 0 and thus be non-conducting. Based on the results of the erase operation and the Valley 0 testing, the FMC 113 can determine that the block is good, bad, or that the block is partially good, in which case the FMC 113 can identify the pages/cells of the block that are still capable of storing data. The identifications of the viable pages/cells can be stored in the mapping table 220 or in some other dedicated table, e.g., in the memory inventory table 262.

The FMC 113 can perform a program operation. (If the failed operation involved a program operation, one or more additional program operation can be performed.) In some embodiments, the program operation can include programming all pages of the block. In some embodiments, the program operation can include programming only some of the pages of the block. Selecting pages to be programmed can be done randomly, or according to a pre-determined schedule, or according to one of a number of pre-determined schedules. The FMC 113 can test the correctness of the program operation at the hardware level. In some embodiments, the correctness of the program operation can be probed using a read operation performed subsequently or by performing a BER procedure. For example, the block or one or more partitions of the block can be determined to be good if the detected BER is below a pre-determined threshold. Conversely, the block or a partition of the block can be determined to be bad if the detected BER is at or above the pre-determined BER. Based on the results of the program operation, as well as subsequent hardware, read, BER, etc., testing, the FMC 113 can determine whether the block is good, bad, or partially good, and store the identification of the good pages/portions of pages/cells in the memory inventory table 262.

The FMC 113 can perform one or more program/erase cycles (PEC) of the block being diagnosed. The number of PECs to be performed can be 1, 2, 5, 10, or any other set number of cycles. Such cycle(s) can help with clearing an undesired charge that can be lodged on the floating gate, or in the host substrate. Upon completion of the set number of program/erase cycles, the FMC 113 can perform one or more testing operations, such as the Valley 0 check, a program (full or partial block) operation, a read (full or partial block) operation, BER check, and the like. Based on the results of the set number of PEC and subsequent testing, the FMC 113 can determine whether the block is good, bad, or partially good, and store the identification of the good pages/portions of pages/cells in the memory inventory table 262.

The FMC 113 can perform one or more operation on blocks that are different from the block being diagnosed, e.g., block 230-1. The blocks to be subjected to such operations can be neighboring memory partitions located in a physical proximity to the block 230-1. The proximate partitions (e.g., nearest neighbor blocks/pages/cells/etc., second-nearest neighbors, and so on) can undergo one or more erase, program, and/or read operations. The purpose of such operations is to test whether the immediate environment of the block 230-1 could have caused the erase or program failure of block 230-1 and whether the changes in the charge states of this immediate environment can restore viability of the block 230-1 by removing interference from the proximate partitions ("aggressor blocks"). In some instances, some of the proximate partitions can be currently storing valid data. In such instances, the partitions with the valid data can be excluded from erase and/or program operations and only free partitions can be used. In some instance, the proximate aggressor partitions with the valid data can be freed (folded) and, subsequently, used in program-erase cycling. The proximate free partitions can be cycled by performing a set number of PECs, e.g., 1, 2, 5, 10, or any other set number of cycles. This set number of PECs can be the same or can be different from the set number of PECs performed on the block 230-1 itself, as described in the previous paragraph. In some embodiments, PECs of the block 230-1 can be performed prior or after PECs of the aggressor blocks. In some embodiments, cycling of the block 230-1 can be performed concurrently with cycling of the aggressor blocks. For example, cycling can be staggered, with one PEC performed on the aggressor block(s) followed with one PEC performed on the block 230-1 followed by another PEC of the aggressor block(s), and so on. Each or some of the PECs can be followed with (or preceded by) BER testing. The process can continue until a target number of PECs is completed. If cycling of the block 230-1 has not succeeded, the block 230-1 can be declared bad (or, subjected to additional testing, as described in other parts of this disclosure). Alternatively, the process can continue until the effect of the aggressor blocks on block 230-1 has been eliminated, as can be evidenced, e.g., by the BER testing. In such instances, the block can be declared good. Based on the results of the proximate blocks cycling and block 230-1 testing, the FMC 113 can determine whether the block is good, bad, or partially good, and store the identification of the good pages/portions of pages/cells in the memory inventory table 262.

At the completion of various diagnostic operations of the scan 260, including but not limited to the operations described above, the FMC 113 can make a determination as to the block's viability. If all physical partitions of the block 230-1 are good or, alternatively, no more than an acceptable (according to the technical specifications of the memory sub-system 110) first fraction of memory partitions (e.g., memory pages or memory cells) in the block 230-1 are bad, FMC 113 can determine that the block 230-1 is good. Consequently, the controller 115 can clear the quarantine flag 232 and, optionally, promote the block 230-1 up the free list 250. For example, the block 230-1 can be placed at the end of the blocks with cleared quarantine flags or at any other position on the free list as can be decided by the FMC 113. In some embodiments, instead of keeping the block on the free list, the FMC 113 can map the PBA of the block to one of the LBAs 210 (e.g., the next unmapped LBA that is called up by the host system 120 for a program operation), use the block for folding data previously stored in some other block(s), or perform any other memory operation.

If more than the acceptable first fraction of memory partitions in the block 230-1 are bad, the FMC 113 can either determine that the block 230-1 is bad or partially good. If the fraction of bad memory partitions in the block 230-1 is above the first fraction but below a second fraction, the FMC 113 can assess the block 230-1 as partially bad and identify good memory partitions for subsequent remapping, as described below. If the fraction of bad memory partitions in the block 230-1 is above the second fraction, the controller 115 can deem the block 230-1 bad. A fraction of bad partitions above the second fraction can indicate that the benefit of salvaging the remaining viable partitions does not justify the computational resources required for the initial remapping and the future memory operations involving weakly-viable blocks (e.g., an overhead of using a large number of blocks that only have a small number of viable cells). Accordingly, the involving weakly-viable blocks can retire the block 230-1 (remove the block from all future memory operations) by placing the block on the retired block list 270.

If the fraction of bad memory partitions in the block 230-1 is between the first fraction and the second fraction, the controller 115 can identify, based on the output of diagnostic testing performed during scan 260, the good memory partitions and store the identifications of in the memory inventory table 262. In some embodiments, partitions can refer to pages. During scan 260, the controller 115 can make a page-by-page determination of a viability of all or some of the pages of the block 230-1. The FMC 113 can then map ("stack") good pages from block 230-1 together with good pages from other (e.g., similarly diagnosed) partially good blocks 280-1, 280-2, etc., to an LBA 210-5 so that the total volume of good memory pages in the blocks 230-1, 280-1, 280-2, etc., is the same as the size of a regular physical memory block (e.g., 512 KB) in the memory sub-system 110. The mapping can be performed by the FMC 113 accessing the memory inventory table 262. Entries in the memory inventory table 262 can include descriptions of all or some memory partitions of all or some blocks that have undergone the scan 260. For example, the memory inventory table 262 can include descriptions of all 128 pages of the block 230-1; the descriptions can have a viability bit (or a multi-bit viability flag) that indicates whether the respective page is viable (good) or bad. The FMC 113 can access the data stored in the memory inventory table 262, and map an LBA (e.g., LBA 210-5) to two or more partially good blocks. The FMC 113 can then store the mapping data (LBA→multiple PBAs) in the mapping table. The FMC 113 can also set a status flag (or a multi-bit status flag) for the whole block and/or for individual pages of the block, indicating that the block 230-1 (or various pages of the block) are remapped. As a result, when the FMC 113 is to map a next LBA to a new collection of partially good blocks, the FMC 113 can limit selection of partially good blocks (and/or pages) to those blocks (or pages) whose status flag in the memory inventory table 262 is not yet set). The procedures and operations described in relation to FIG. 2 allow for efficient management of memory blocks and prevent unnecessary early retirement of viable blocks.

Figure 3:
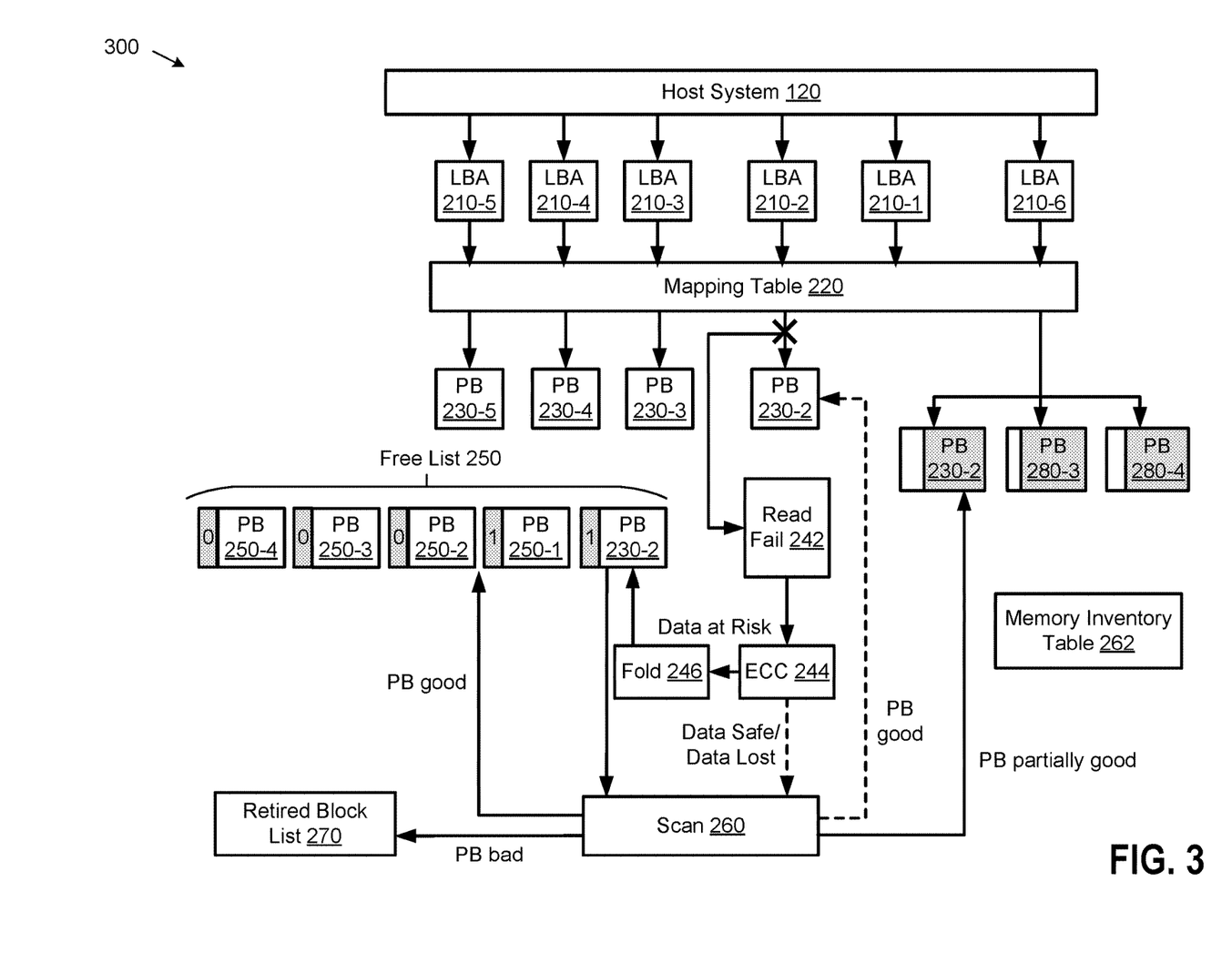
FIG. 3 illustrates schematically a high-level description of efficient management of memory blocks involved in failed read operations in memory sub-systems, in accordance with some embodiments of the present disclosure.

FIG. 3 illustrates schematically a high-level description of efficient management 300 of memory blocks involved in failed read operations in memory sub-systems, in accordance with some embodiments of the present disclosure. All or some of the procedures and operations performed in response to an erase or a program failure described in relation to FIG. 2, can be similarly implemented in relation to a read failure described below in reference to FIG. 3. It shall, therefore, be understood that only procedures and operations that can be performed in a different manner in response to a read failure (compared with erase or program failure) are described below. The difference between procedures and operation of FIG. 2 and FIG. 3 can reflect the fact that a read operation is typically performed to access a data that is to be preserved while the viability diagnostics are performed on the suspect block.

In some embodiments, a read request referencing an LBA 210-2 and mapped (in the mapping table 220) to a block 230-2 can fail to execute properly (box 242). For example a bit parity check can indicate that the data stored in block 230-2 has changed since the time it was programmed. In some embodiments, the memory sub-system controller 115 and/or the FMC 113 can perform an ECC procedure 244 to determine the state of the data stored in the physical block 230-2. If the BER count indicates that the data stored in block 230-2 is at risk of being lost, the FMC 113 can fold the block (box 246). Specifically, the FMC 113 (or another component of the controller 115) can copy the data to a different block, place the block 230-2 on the free list 250 of physical blocks that are currently not storing valid data, and set the quarantine flag as described in relation to FIG. 2.

If the data stored in block 230-2 is safe or, to the contrary, if the data has already been lost (e.g., the ECC has not been able to recover the data), the FMC 113 can proceed with a variety of diagnostic testing (scan 260), such as any or all the diagnostic operations described in relation to FIG. 2. If the data is still good, the FMC 113 can either 1) perform diagnostic operations that do not require erasing or programming the block 230-2, or 2) temporarily (e.g., until the scan 260 is complete) or permanently move (fold) the content of the block to another block, to another memory device, to volatile memory, or the like.

At the completion of various diagnostic operations of the scan 260, the FMC 113 can make a determination as to the block's viability (ability to store data). The FMC 113 can determine that the block 230-1 is good. If the block 230-2 has been previously placed on the free list with a quarantine flag set, the FMC 113 can clear the quarantine flag and, optionally, promote the block 230-1 up the free list 250 ("PB good" operation indicated by a solid line). If the block 230-2 has not been previously placed on the free list, the FMC 113 can return the block 230-2 to the usual circulation with the previously stored data still stored therein ("PB good" operation indicated by a dashed line).

The FMC 113 can determine that the block 230-2 is bad and place the block on a retired block list 270. The FMC 113 can determine that the block 230-2 is partially good and map an LBA (e.g., LBA 210-6) to two or more partially good blocks (e.g., blocks 230-2, 280-3, 280-4 . . . ) and store the corresponding mapping data (LBA→multiple PBAs) in the mapping table 220. The criteria for determining whether the block 230-2 is good, partially good, or bad can be the same or similar to the criteria described in relation to FIG. 2.

Figure 4:
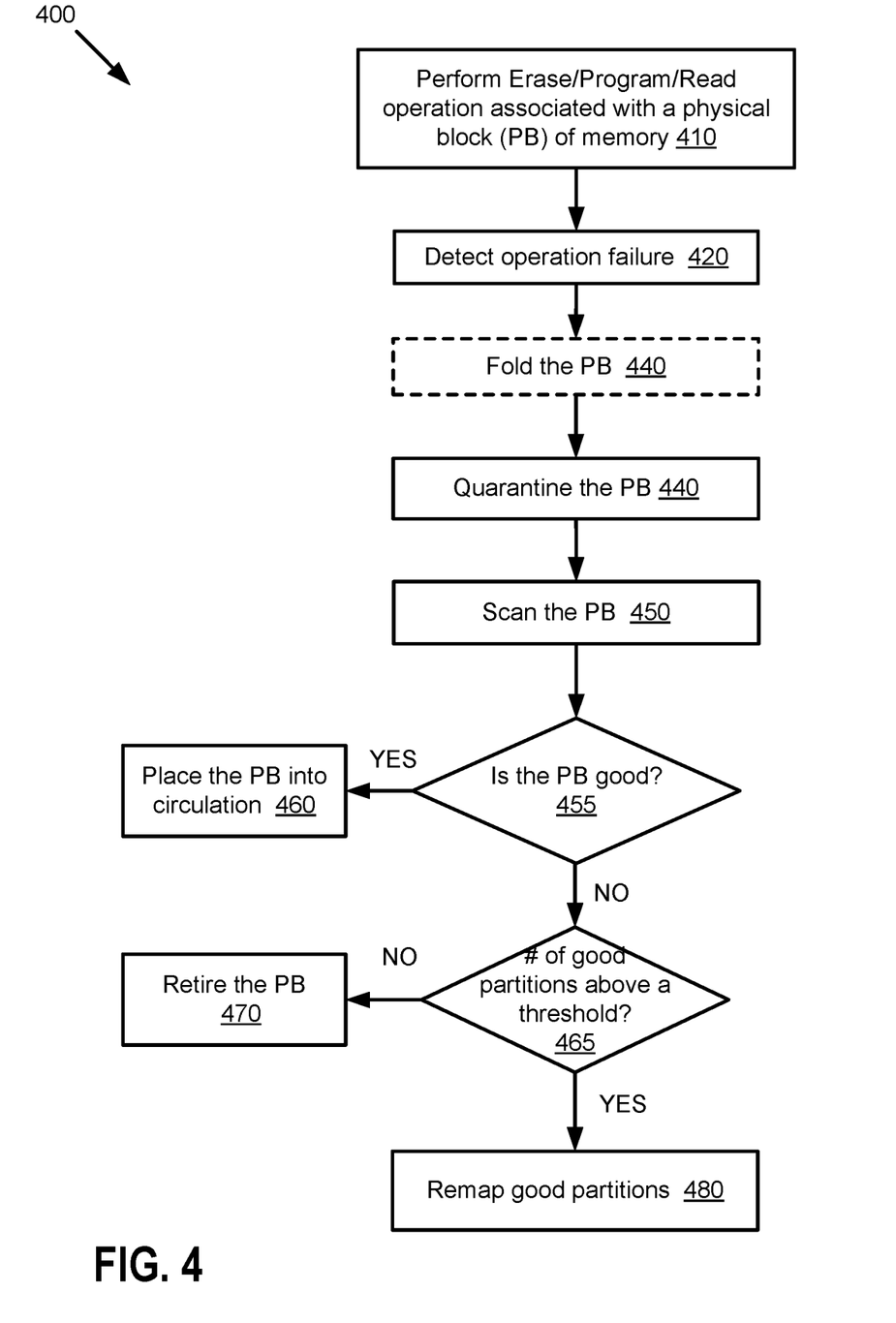
FIG. 4 illustrates a flow diagram depicting schematically an example method of efficient management of memory blocks involved in failed operations in memory sub-systems, in accordance with implementations of the present disclosure.

FIG. 4 illustrates a flow diagram depicting schematically an example method 400 of efficient management of memory blocks involved in failed operations in memory sub-systems, in accordance with implementations of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the FMC 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic can perform an erase, program, or read operation associated with a physical block (PB) of memory. At operation 420 of method 400, the processing logic can detect (e.g., using a hardware circuit of the memory subsystem 110) a failure of the memory operation. If the operation is the read operation, at operation 430 of method 400, the processing logic can perform an optional folding of the PB. If the memory operation is an erase or program operation or if the PB has been folded, at operation 440, the processing logic can quarantine the PB and place the PB on the free list of blocks. The processing logic can then perform a number of diagnostic scans to determine the viability of the PB. At operation 455, if the PB is determined to be good, the processing logic can perform operation 460 and place the PB into standard circulation and use the PB in accordance with various protocols of the memory sub-system 110 management. For example, the PB can be placed on the free list 250 at the end of viable PBs or can be used by the controller 115 based on the total PEC over the lifetime of the PB (so that the blocks with a lower PEC are programed first whereas blocks with a higher PEC are programmed last). If, at operation 455, the processing logic does not assess the PB to be good, the processing logic can determine, at operation 465, if the PB is partially good. If the number of bad (non-viable) partitions (e.g., pages) in the PB exceeds a threshold, at operation 470, the processing logic can retire the PB. If the number of non-viable partitions is below the threshold, at operation 480, the processing logic can remap the good partitions as described above in relation to FIGS. 2 and 3.

Figure 5:
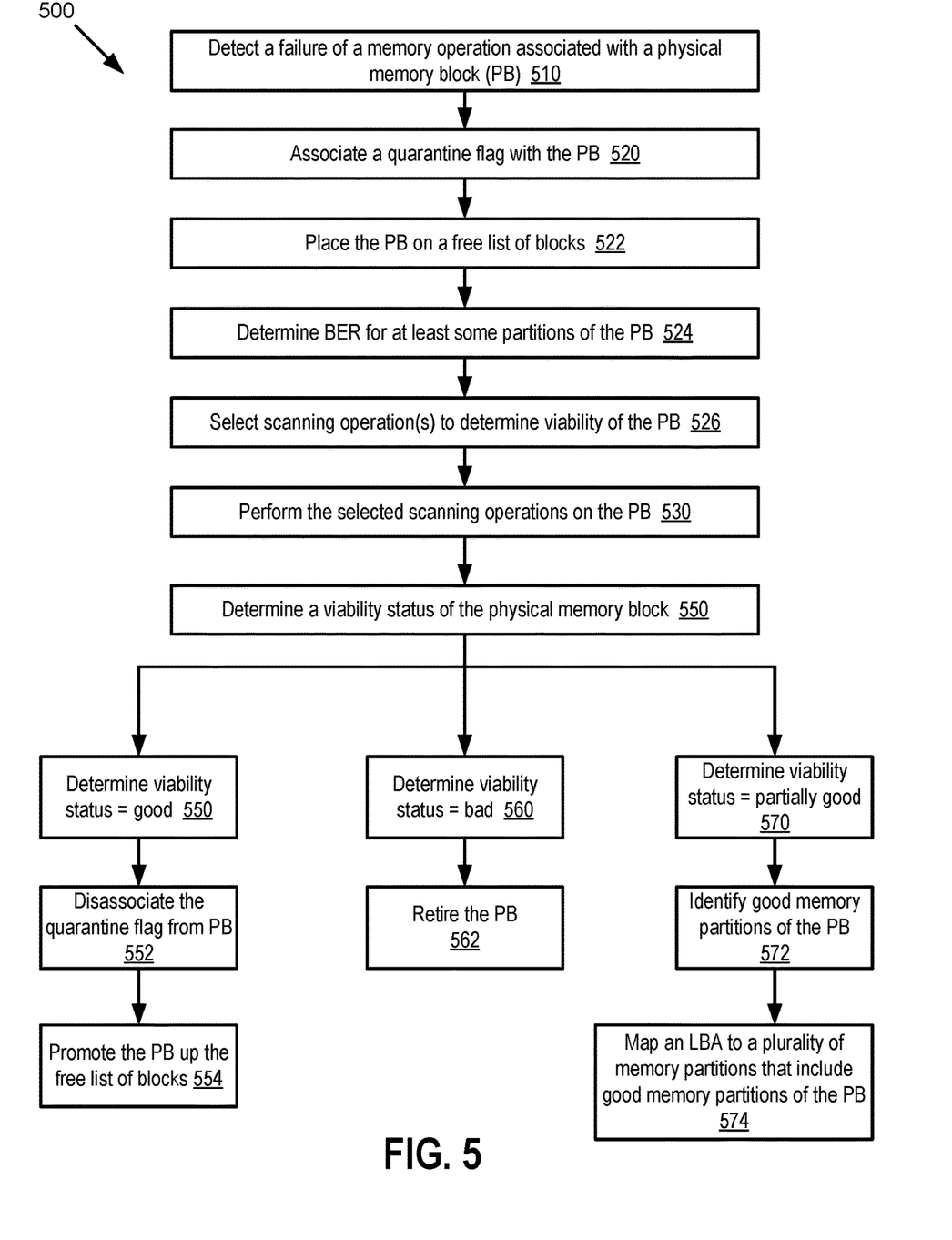
FIG. 5 illustrates a flow diagram depicting schematically another example method of efficient management of memory segments involved in failed operations in memory sub-systems, in accordance with some embodiments of the present disclosure.

FIG. 5 illustrates a flow diagram depicting schematically another example method 500 of efficient management of memory segments involved in failed operations in memory sub-systems, in accordance with some embodiments of the present disclosure. In one embodiment, the controller 115 of the memory sub-system (in particular, the FMC 113 of the controller 115) can perform the example method 500, based on instructions stored in the embedded memory of the local memory 119. In some embodiments, the firmware of the memory sub-system 110 (or memory device 130) can perform the example method 500. In some embodiments, the local media controller 135 can perform the example method 500. In some embodiments, an outside processing device, such as the processing device of the host system 120, can perform the example method 400. Various operations of method 500 can be performed in a different order compared with the order shown in FIG. 5. Some operations of method 500 can be performed concurrently with other operations. Some operations can be optional. Whereas description of operations of method 500 refers to "memory blocks," it shall be understood that method 500 can similarly be apply to management of memory segments of any size and place in the memory hierarchy (e.g., dies, planes, collections of blocks, pages, fractions of pages, and the like).

Method 500 can be implemented in a memory device that includes a number of physical memory blocks. The memory device can have an associated logical address space mapped onto physical block addresses of the physical memory blocks of the memory device. At operation 510, the processing logic performing method 500 can involve detecting a failure of a memory operation associated with a physical memory block of the memory device. The memory operation can be an erase, program, or read operation. At operation 520, the processing logic can associate a quarantine flag with the physical memory block. The quarantine flag associated with the physical memory block can indicate that the physical memory block is not to be used in program operations (as long as the quarantine flag is not cleared). At operation 522, responsive to detecting the failure of the memory operation associated with the physical memory block, the processing logic can place the physical memory block on a free list of blocks. In some embodiments, the physical memory block can be placed at the tail end of the free list. More specifically, a physical memory block last placed on the list can, respectively, be the last block (of all the blocks that are currently on the list) to be used for a program operation that the memory sub-system controller 115 is to perform in the future. In some embodiments, operations 520 and 522 are not performed, or performed later in the method. For example, if the failed memory operation is a read operation and the physical memory block stores valid data, the processing device performing method 500 does not place the block on the free list and/or does not associate the quarantine flag with the block, in some embodiments.

Method 500 can continue, at operation 524, with the processing logic determining, responsive to detecting the failure of the memory operation, a bit error rate for at least some partitions of the physical memory block. In some embodiments, the operation 524 can be performed in the instances where the failed memory operation is a read operation. Upon performing operation 524, the processing device can make a determination whether data stored in the physical memory block is safe, lost, or at risk of being lost. In some embodiments, if the data stored in the physical memory block is at risk of being lost, the block can be folded and placed on the free list, as in operation 522. In some embodiments, if the data stored in the physical memory block has already been lost, the block can likewise be placed on the free list. If the data stored in the physical memory block is safe, the block, in some embodiments, can be kept away (at least temporarily) from the free list.

At operation 526, method 500 can continue with the processing logic selecting one or more scanning operations for the physical memory block. In some embodiments, the scanning operations selected by the processing device can be based on the type of the failed memory operation, e.g., on whether the failed memory operation is an erase, a program, or a read operation. In some embodiments, the scanning operation for a failed read operations can be additionally based on the determination whether the data stored in the physical memory block is safe, lost, or at risk of being lost. For example, if the data has been lost or folded to a different block, the scanning operations selected for the block can be similar to the operations selected in the instances of an erase or a program failure (where the physical memory device does not store valid data or data that has to be saved). For example, the processing device can associate a quarantine flag with the physical memory block and place the physical memory block on the free list of blocks. Accordingly, the processing device can select, among other operations, one or more program and erase cycles (PECs). On the other hand, in some instances the data stored in the physical memory block can be preserved. In such instances, the processing device can select scanning operations that probe the viability of the block without erasing or disturbing the data.

At operation 530, method 500 can continue with the processing logic performing one or more selected scanning operations to determine viability of the physical memory block. In some embodiments, the selected scanning operation can include one or more program and/or erase operations on the physical memory block. In some embodiments, the selected scanning operations can include programming one or more partitions of the physical memory block, such as at least some (or all) of the memory pages of the physical memory block. In some embodiments, at least one scanning operation can include reading one or more partitions of the physical memory block. In some embodiments, at least one scanning operation can include determining BER for one or more partitions of the physical memory block. In some embodiments, at least one scanning operation can include erasing or programming one or more memory partitions that are proximate to the physical memory block (e.g., "aggressor blocks" or pages, which have the strongest electrostatic interference effect on the memory pages of the block being diagnosed).

At operation 540, method 500 can continue with the processing logic determining, based on results of the one or more scanning operations, a viability status of the physical memory block. The viability status of the physical memory block can indicate an ability of the physical memory block to store data. The viability status of the physical memory block can be one of a bad block, a good block, or a partially good block. If the viability status of the physical memory block is determined to be a good block (operation 550), the processing logic can disassociate the quarantine flag from the physical memory block (operation 552) and, optionally, promote the physical memory block up the free list of blocks (operation 554).

If the viability status of the physical memory block is determined to be a bad block, at operation 560, the processing logic can remove the block from the free list and retire the block from future use (operation 562). If the viability status of the physical memory block is determined to be a partially good block at operation 570, the processing logic can identify good memory partitions of the physical memory block (operation 572), e.g., good memory pages of the block. At operation 574, the processing logic can map a logical block address to set of physical memory partitions. Some (e.g., at least one) of the memory partitions of the set can belong to the physical memory block under diagnostics, whereas other memory partitions can be memory partitions outside the physical memory block, e.g., can belong to other memory blocks (such as blocks diagnosed earlier or later than the currently diagnosed memory block). In some embodiments, a combined memory capacity of the mapped physical memory partitions (including the memory partitions of the current block and the memory partitions of other blocks) is a standard physical memory block capacity of the memory device.

Figure 6:
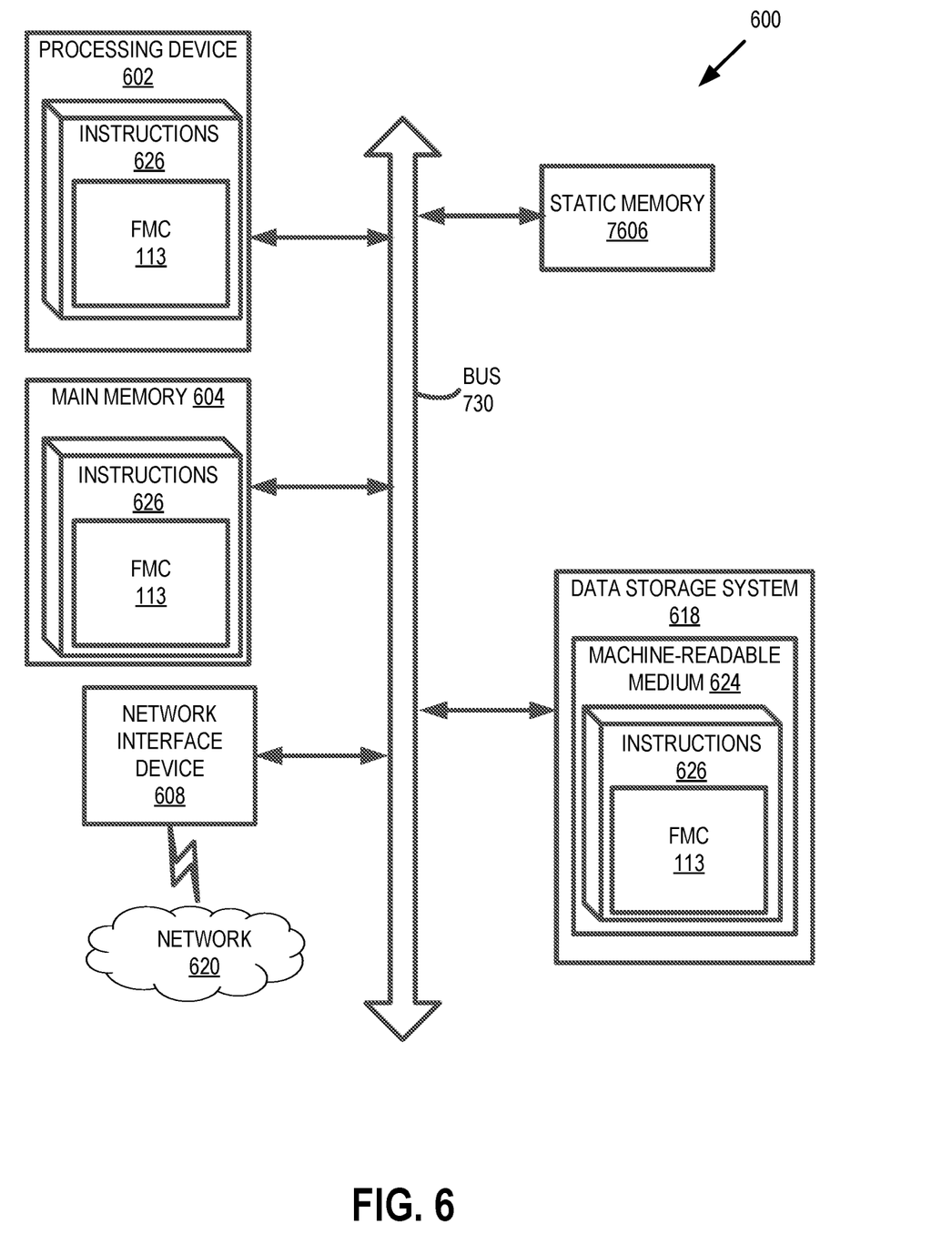
FIG. 6 is a block diagram of an example computer system in which embodiments of the present disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the failure management memory component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a non-transitory computer-readable storage medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to the FMC 113 of FIG. 1. While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the disclosure. The term "machine-readable storage medium" shall accordingly be taken to include, but not be limited to, solid-state memories, optical media, and magnetic media.

Some portions of the preceding detailed descriptions have been presented in terms of operations and symbolic representations of operations on data bits within a computer memory. These algorithmic descriptions and representations are the ways used by those skilled in the data processing arts to most effectively convey the substance of their work to others skilled in the art. An algorithm or operation is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms, operations, and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the disclosure is not described with reference to any particular programming language. It will be appreciated that a variety of programming languages can be used to implement the teachings of the disclosure as described herein.

The disclosure can be provided as a computer program product, or software, that can include a machine-readable medium having stored thereon instructions, which can be used to program a computer system (or other electronic devices) to perform a process according to the disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims can generally be construed to mean "one or more" unless specified otherwise or clear from context to be directed to a singular form. Moreover, use of the term "an embodiment" or "one embodiment" or "an embodiment" or "one embodiment" or the like throughout is not intended to mean the same embodiment or embodiment unless described as such. One or more embodiments or embodiments described herein can be combined in a particular embodiment or embodiment. The terms "first," "second," "third," "fourth," etc. as used herein are meant as labels to distinguish among different elements and do not necessarily have an ordinal meaning according to their numerical designation.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a memory device comprising a plurality of physical memory segments, wherein each of the physical memory segments comprises a plurality of memory cells; and
   a processing device, operatively coupled with the memory device, to perform operations comprising:
      responsive to detecting a failure of a memory operation associated with a physical memory segment of the plurality of physical memory segments, performing one or more scanning operations associated with the physical memory segment to estimate a fraction of bad memory cells in at least a sub-plurality of memory cells of the physical memory segment; and determining, based on a relationship of the estimated fraction of bad memory cells to one or more threshold fractions, a viability status of the physical memory segment, wherein the viability status indicates an ability of the physical memory segment to store data.

2. The system of claim 1, wherein the sub-plurality of memory cells is randomly selected from a plurality of memory cells of the physical memory segment.

3. The system of claim 1, wherein the one or more scanning operations comprise at least one of:
- erasing one or more partitions of the physical memory segment;
- programming one or more partitions of the physical memory segment; or
- determining a number of errors associated with reading one or more partitions of the physical memory segment.

4. The system of claim 1, wherein the one or more scanning operations comprise erasing or programming one or more memory partitions that are electrostatically proximate to the physical memory segment.

5. The system of claim 1, wherein the operations further comprise:
- responsive to detecting the failure of the memory operation associated with the physical memory segment, associating a quarantine flag with the physical memory segment, wherein the quarantine flag indicates that the physical memory segment is, at least temporarily, not to be used in program operations.

6. The system of claim 1, wherein the operations further comprise:
- responsive to detecting the failure of the memory operation associated with the physical memory segment, placing the physical memory segment at a tail end of a free list of physical memory segments.

7. The system of claim 1, wherein determining the viability status of the physical memory segment comprises one of:
- responsive to the fraction of bad memory cells being below a first threshold fraction, determining the viability status of the physical memory segment to be a good segment status, wherein the good segment status indicates that the physical memory segment is to be placed in general circulation; or
- responsive to the fraction of bad memory cells being above a second threshold fraction, determining the viability status of the physical memory segment to be a bad segment status, wherein the second threshold is equal or greater the first threshold fraction.

8. The system of claim 1, wherein determining the viability status of the physical memory segment comprises:
- responsive to the fraction of bad memory cells being above a first threshold fraction and below a second threshold fraction, determining the viability status of the physical memory segment to be a partially good segment status; and wherein the operations further comprise:
- identifying one or more good physical memory partitions of the physical memory segment; and
- mapping a logical block address to a plurality of physical memory partitions, wherein the plurality of physical memory partitions comprises:
  - the one or more good physical memory partitions of the physical memory segment, and
  - at least one good physical memory partition outside the physical memory segment.

9. A method comprising:
- detecting, by a processing device operatively coupled with a memory device, a failure of a memory operation associated with a physical memory segment of a plurality of physical memory segments of the memory device;
- responsive to detecting the failure of the memory operation, performing one or more scanning operations associated with the physical memory segment to estimate a fraction of bad memory cells in at least a sub-plurality of memory cells of the physical memory segment; and
- determining, based on a relationship of the estimated fraction of bad memory cells to one or more threshold fractions, a viability status of the physical memory segment, wherein the viability status indicates an ability of the physical memory segment to store data.

10. The method of claim 9, wherein the sub-plurality of memory cells is randomly selected from a plurality of memory cells of the physical memory segment.

11. The method of claim 9, wherein the one or more scanning operations comprise at least one of:
- erasing one or more partitions of the physical memory segment;
- programming one or more partitions of the physical memory segment; or
- determining a number of errors associated with reading one or more partitions of the physical memory segment.

12. The method of claim 9, wherein the one or more scanning operations comprise erasing or programming one or more memory partitions that are electrostatically proximate to the physical memory segment.

13. The method of claim 9, further comprising:
- responsive to detecting the failure of the memory operation associated with the physical memory segment, associating a quarantine flag with the physical memory segment, wherein the quarantine flag indicates that the physical memory segment is, at least temporarily, not to be used in program operations.

14. The method of claim 9, further comprising:
- responsive to detecting the failure of the memory operation associated with the physical memory segment, placing the physical memory segment at a tail end of a free list of physical memory segments.

15. The method of claim 9, wherein determining the viability status of the physical memory segment comprises one of:
- responsive to the fraction of bad memory cells being below a first threshold fraction, determining the viability status of the physical memory segment to be a good segment status, wherein the good segment status indicates that the physical memory segment is to be placed in general circulation; or
- responsive to the fraction of bad memory cells being above a second threshold fraction, determining the viability status of the physical memory segment to be a bad segment status, wherein the second threshold is equal or greater the first threshold fraction.

16. The method of claim 9, wherein determining the viability status of the physical memory segment comprises:
- responsive to the fraction of bad memory cells being above a first threshold fraction and below a second threshold fraction, determining the viability status of the physical memory segment to be a partially good segment status; and wherein the method further comprises:
- identifying one or more good physical memory partitions of the physical memory segment; and mapping a logical block address to a plurality of physical memory partitions, wherein the plurality of physical memory partitions comprises:
  the one or more good physical memory partitions of the physical memory segment, and
  at least one good physical memory partition outside the physical memory segment.

17. A non-transitory computer-readable memory storing instructions thereon that, when executed by a processing device, cause the processing device to perform operations comprising:
  detecting, by a processing device operatively coupled with a memory device, a failure of a memory operation associated with a physical memory segment of a plurality of physical memory segments of the memory device;
  responsive to detecting the failure of the memory operation, performing one or more scanning operations associated with the physical memory segment to estimate a fraction of bad memory cells in at least a sub-plurality of memory cells of the physical memory segment; and
  determining, based on a relationship of the estimated fraction of bad memory cells to one or more threshold fractions, a viability status of the physical memory segment, wherein the viability status indicates an ability of the physical memory segment to store data.

18. The non-transitory computer-readable memory of claim 17, wherein the one or more scanning operations comprise at least one of:
  erasing one or more partitions of the physical memory segment;
  programming one or more partitions of the physical memory segment; or
  determining a number of errors associated with reading one or more partitions of the physical memory segment.

19. The non-transitory computer-readable memory of claim 17, wherein determining the viability status of the physical memory segment comprises one of:
  responsive to the fraction of bad memory cells being below a first threshold fraction, determining the viability status of the physical memory segment to be a good segment status, wherein the good segment status indicates that the physical memory segment is to be placed in general circulation; or
  responsive to the fraction of bad memory cells being above a second threshold fraction, determining the viability status of the physical memory segment to be a bad segment status, wherein the second threshold is equal or above the first threshold fraction.

20. The non-transitory computer-readable memory of claim 17, wherein determining the viability status of the physical memory segment comprises:
  responsive to the fraction of bad memory cells being above a first threshold fraction and below a second threshold fraction, determining the viability status of the physical memory segment to be a partially good segment status; and wherein the operations further comprise:
  identifying one or more good physical memory partitions of the physical memory segment; and
  mapping a logical block address to a plurality of physical memory partitions, wherein the plurality of physical memory partitions comprises:
    the one or more good physical memory partitions of the physical memory segment, and
    at least one good physical memory partition outside the physical memory segment.

* * * * *